United States Patent

[11] 3,581,631

| [72] | Inventors | Sigbert Samson Rozendaal;<br>Jacobus P. Van Der Ploeg, Gelp, both of, Netherlands |
|---|---|---|
| [21] | Appl. No. | 824,084 |
| [22] | Filed | May 13, 1969 |
| [45] | Patented | June 1, 1971 |
| [73] | Assignee | American Enka Corporation Enka, N.C. |
| [32] | Priority | May 16, 1968 |
| [33] | | Netherlands |
| [31] | | 6,806,899 |

[54] MANUFACTURE OF FILM REINFORCED BITUMINOUS STRUCTURES
13 Claims, 4 Drawing Figs.

[52] U.S. Cl. .................................................94/23, 94/8, 94/9, 156/95
[51] Int. Cl. ................................................ C09j 3/30
[50] Field of Search........................................... 156/321, 337; 161/92, 94, 95, 234, 236; 94/7, 9, 23

[56] References Cited
UNITED STATES PATENTS

| 1,609,938 | 12/1926 | Forrest | 156/337X |
| 1,706,077 | 3/1929 | Sadtler | 94/9 |
| 2,115,667 | 4/1938 | Ellis | 94/7 |
| 2,593,553 | 4/1952 | Francis | 161/92 |
| 2,787,570 | 4/1957 | Lott | 161/95X |
| 3,138,505 | 6/1964 | Hirsch | 156/94 |
| 3,222,237 | 12/1965 | McKelvey | 161/95X |
| 3,444,024 | 5/1969 | Hillas | 161/92X |

OTHER REFERENCES
Engineering News-Record Oct. 3, 1935 pages 453, 454, 455 94/23

*Primary Examiner*—Jacob L. Nackenoff
*Attorney*—Francis W. Young

ABSTRACT: A process for the manufacture of a film reinforced bituminous structure including at least one bitumen-containing layer which comprises the steps of applying a polymeric adhesive film containing synthetic threads and thereafter applying a molten layer of bitumen-containing material to the film so that the adhesive will soften and promote adhesion between the two layers of material and the synthetic threads. The film is formed of a plurality of synthetic reinforcing threads, e.g. a fabric of polyester threads, having spaces therebetween filled with the polymeric adhesive, e.g. montan resin. A process and an apparatus for forming the thread containing film are also disclosed.

Patented June 1, 1971

3,581,631

INVENTORS
SIGBERT SAMSON &
JACOBUS PIETER VAN DER PLOEG

BY Francis W. Young
ATTORNEY

MANUFACTURE OF FILM REINFORCED BITUMINOUS STRUCTURES

This invention relates to the manufacture of reinforced bituminous structures such as covering layers or plates, and especially asphalt roads, and more particularly to a process for producing bituminous structures reinforced with a film made up of synthetic threads, or bundles of the threads, having an adhesive uniquely applied thereto, and to the resulting reinforced structures as well as to the thread-containing film used therein and the process for producing such films.

A process for reinforcing bituminous materials similar to that of this invention is known. In the known process for the manufacture of bituminous asphalt roads, in which the entire asphalt road surface consists of two successive layers, one being applied some time after the other, a relatively wide-meshed woven fabric is provided between the first and the second asphalt layers. This fabric is marketed under the trade name "Structofors" and is made up of polyester threads with surfaces on which an adhesive has been applied.

Moreover, to obtain a satisfactory adhesion between the first and the second asphalt layer, a bitumen-containing emulsion is, after the application of the aforementioned reinforcing fabric, sprayed on to the first asphalt layer. However, depending on the weather conditions the spraying of the bitumen-containing emulsion is usually difficult. Moreover, this practice requires skilled workers to apply the emulsion properly and uniformly.

This invention advantageously provides a process for forming bituminous structures such as covering layers and asphalt roads which does not show the above-noted disadvantages.

Thus, this invention contemplates a process for the manufacture of reinforced bituminous structures in which a reinforcement is applied to one layer of bituminous material in the form of a thread-containing film having the meshes or spaces between the crossing threads or thread bundles entirely or partially filled with an adhesive. Preferably the spaces are entirely filled to provide greater reinforcement. When the process according to the invention is employed, spraying of the bitumen emulsion can be omitted. This means not only a saving of labor but also a simplification in the manufacture of asphalt roads.

According to the process of the present invention the thread-containing film with filled meshes is simply unrolled on a first asphalt layer, after which a second asphalt layer may immediately be applied to the film-covered first asphalt layer. Construction of an asphalt road with a reinforced film, in accordance with this invention, may be accomplished more readily and in a shorter time than the construction of a conventional reinforced asphalt road, because, in the case of the known reinforced asphalt road, the bitumen-containing emulsion usually must be sprayed by hand on to the first asphalt layer. As a result of the high asphalt temperatures used the reinforced film, after it has cooled down, will form an integral mass with the two asphalt layers.

According to the present invention, use is advantageously made of a film containing an adhesive substantially consisting of montan resin, tall resin, rosin or a synthetic polymer having a softening point higher than 50° C., which, in a softened condition, wets the reinforcing threads and which is miscible with the bitumen in the bituminous asphalt layers in a molten condition.

Moreover, it is preferred that a film having an adhesive containing from 5 to 20 percent by weight of a softening agent be used. Particularly favorable results are obtained with a softening agent which consists of a copolymer of vinyl acetate and ethylene.

In accordance with this invention, the surface area of the meshes between the crossing threads in the reinforcing film applied is at least approximately 5 mm.$^2$.

This invention also is concerned with the covering layers or asphalt roads manufactured by the above-described process.

The process for producing the film reinforced with synthetic threads, which is to be used in the manufacture of covering layers or plates, is characterized in that a heated, liquid (i.e. molten) adhesive with a softening agent is applied to a sheet of threads, for instance a fabric, travelling over an endless belt, a downward pressure is applied to the adhesive-covered sheet by a second endless belt, and the adhesive-impregnated sheet or film is cooled before it leaves the endless belts. Advantageously a nonblocking agent is applied to the cooled thread-containing film, and the film is wound into a roll after it has left the endless belts.

The apparatus for carrying out this process is characterized in that it comprises the lower and upper driven endless belts, feed means for applying the adhesive, and heating and cooling means, which extend one after the other in the direction of travel of the belts, as well as feed means for the sheet of threads and withdrawing means for the film product.

One embodiment of the process of the invention for the manufacture of bituminous covering layers, more particularly asphalt roads, wherein a reinforcement of film containing threads or thread bundles is applied, and a sublayer is provided under the covering layers, for instance a sand bed, is with advantage further characterized in that the reinforced film is directly applied to the sublayer, and one or more bitumen layers are applied to this film. It has surprisingly been found that heavily laden vehicles may run on the reinforced film and that the tracks left in the sublayer are then less deep. This shows that the effect produced by the film is comparable to that of the steel strips previously used for this purpose.

It also will be understood that in cases where an asphalt road is manufactured in two layers, the reinforced film may according to the invention advantageously be applied between two successive layers of bitumen or asphalt.

The invention will be further described with reference to the accompanying schematic drawings in which.

Figure 1:
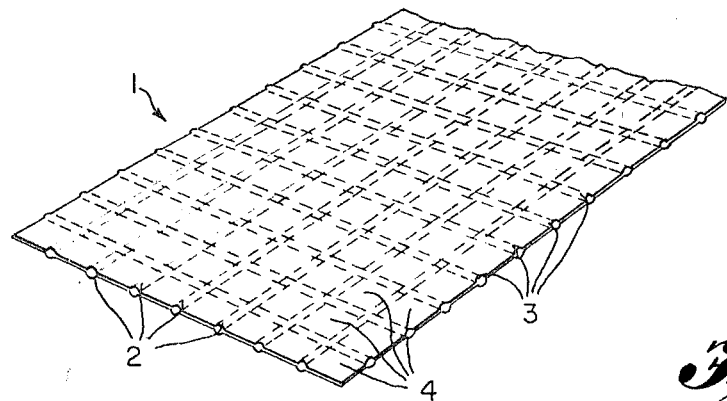
FIG. 1 is a perspective view of a reinforced film with filled meshes.
Figure 2:
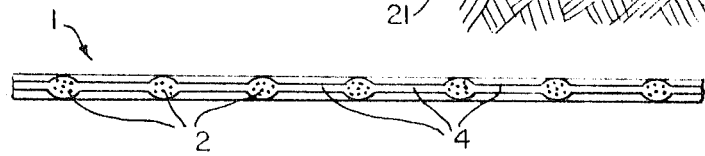
FIG. 2 is a cross-sectional view, on a larger scale, of part of the film.

In FIG. 1 the polymeric adhesive film generally indicated by reference numeral 1 consists of a relatively wide-meshed fabric made up of crossing thread bundles 2 and 3, which are shown in broken lines because their surface is entirely coated with a suitable adhesive such as montan resin. As can be seen from FIG. 2, the adhesive not only surrounds the threads 2 and 3 but also fills the meshes 4, i.e., the areas or spaces between the crossing threads. In this way there is obtained a polymeric film 1 which has an uninterrupted surface and which is reinforced with the thread bundles 2 and 3.

Figure 3:
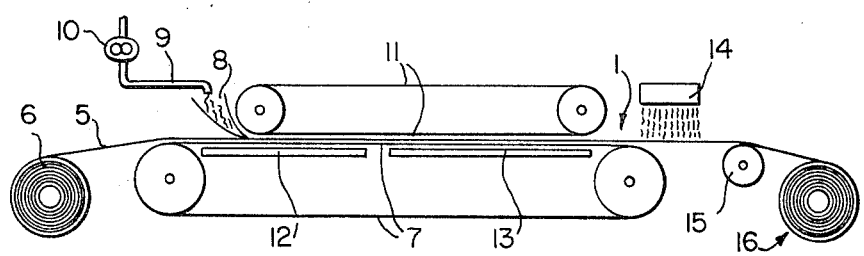
FIG. 3 shows an apparatus for the manufacture of the reinforced film.

FIG. 3 shows an apparatus for the coating a fabric made up of crossing thread bundles with an adhesive to obtain the reinforced polymeric film 1. A noncoated fabric 5 is supplied from a roll 6 and passed over a driven lower endless belt 7. From a slit 8 a film of molten adhesive is applied to the fabric. The slit extends across the full width of the fabric and is fed by way of a conduit 9 and a pump 10. Located past the slit 8 at a short distance therefrom is an upper driven endless belt 11, which applies a downward pressure to the upper surface of the adhesive-covered fabric. Provided under the first portion or heating section of the belts 7 and 11 is an elongated heating element 12 such as a radiant heater and under the last portion or cooling section of the belts an elongated cooling element 13 such as cooling coil. The heating element 12 serves to heat the fabric and also to ensure a proper flow of the adhesive between the threads and into the meshes. As the fabric coated with the liquid (i.e., molten) adhesive is compressed between the endless belts 7 and 11, there is obtained a rapid and proper impregnation. The cooling element 13 serves to obtain a rapid solidification of the adhesive, so that a relatively smooth, reinforced polymeric film is formed which does not stick to the two conveyor belts 7 and 11. A metering device 14 is provided beyond the belts which may be used for spraying a nonblocking agent, for instance talcum powder, on to the film 1. After passing a guide roll 15, the completed reinforced film may be wound into a roll 16. The completed film has a thickness of only a few tenths of a millimeter (e.g. 0.3 to 0.6), so that one roll may contain a fairly great length of film.

Particularly favorable results are obtained when use is made of fabrics having a mesh-width of 5 to 10 mm. Although it is preferred to use threads made of a polyester, e.g. polyethylene terephthalate, it is possible to apply threads of other synthetic linear polymers such as the polyamides, e.g. nylon.

Figure 4:
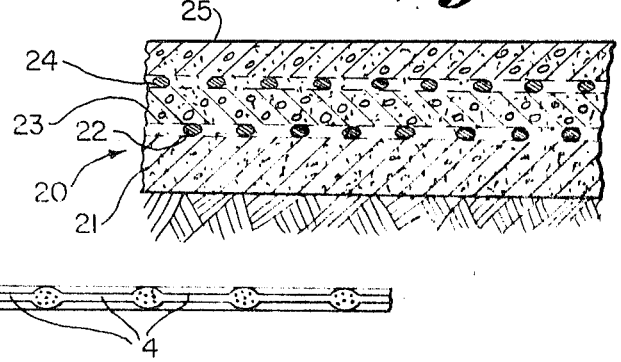
FIG. 4 shows a bituminous structure manufactured by a process of this invention.

In FIG. 4 reference numeral 20 designates one embodiment of a film reinforced bituminous structure, i.e., a section of an asphalt road, produced by the process of this invention. The asphalt road comprises a subbed of sand 21, a thread-containing film 22 made of polyester threads and montan resin of the type shown in FIG. 1, a first asphalt layer 23, an intermediate reinforcing film 24, and a second asphalt layer 25. As shown, the asphalt layers and the intermediate film layer 24, which is also similar in construction to film 22, are bonded together as an integral mass which is secured to the subbed by the film 22.

It will be understood that the adhesive portions of the films 22 and 24 are shown by dashed lines, since upon being contacted with the molten asphalt, the adhesive also becomes molten and thereby miscible with the asphalt so that it diffuses or mixes into the adjacent asphalt layers.

It will be appreciated that the term "bitumen" as used herein includes products which in the English technical literature are officially referred to as "asphaltic bitumen" or "bitumen" as defined on page 549 of *The Petroleum Handbook* published in 1948 by the Shell Petroleum Company Limited. Thus "bitumen" includes asphaltlike hydrocarbons such as asphalt, asphaltites, asphaltic pyrobitumens, mineral tars, mineral waxes, e.g., ozokerite and the like which may be hard and brittle, or semisolid substances. Also the terms "asphalt" or "asphaltic" as used herein are to include the meanings set forth on the above-noted page 549 of *The Petroleum Handbook*.

Moreover, it will be appreciated that the bituminous structures obtained by this invention include those having one or more layers, coatings, plates or the like of bitumen-containing materials which are bonded by a reinforcement in the form of the thread-containing film. Moreover, it will be understood that the expressions "bitumen-containing materials" or "asphalt layers" are meant to encompass those materials having bitumen or asphalt as a base for other substances including aggregates, organic and inorganic fillers and the like materials commonly used in the preparation of bituminous structures.

The synthetic threads suitable for the purposes of this invention include such fiber-forming materials as the polyamides prepared from lactams, e.g., caprolactam and polyamides prepared from diamines and dicarboxylic acids, e.g., hexamethylene diamine and adipic acid, and the polyesters prepared from terephthatic acid or its ester forming derivatives thereof, and glycols, e.g., polyethylene terephthalate and the like.

Moreover, it will be appreciated that other synthetic fiber-forming materials including polyacrylonitrile and certain copolymers of acrylonitrile and the like synthetic linear polycondensation may be used to form the threads used to produce the thread-containing films of this invention. As heretofore noted, the polyester threads are preferred.

In general, the reinforcing threads are formed of multifilament yarns having a relatively high denier, e.g., 1000 or higher, with a filament denier of 3 or more.

As heretofore described, the adhesives suitable for forming the thread-containing reinforcing films of this invention are natural and synthetic polymers having a softening point higher than 50° C. and usually in the range of from 50° to 160° C; which in a softened condition wet the reinforcing threads and which are miscible in the molten condition with the bitumen in the bitumen-containing or asphalt layers to promote adhesion between the reinforcing threads and the bituminous materials.

Moreover, it will be understood that "montan resin" is the resin which is contained in montan wax and which may be separated by extraction. In general, this resin is contained in montan wax in amounts ranging between 25 to 50 percent by weight. Montan wax is derived from lignite, a low rank coal by countercurrent extraction.

Montan resin may be characterized by a solidifying point (or softening point) between 60° to 80° C. and more often by a solidifying point between about 75° to 76° C. In general, the acid value of this resin is between 30 to 40 and its saponification number is in the range of 55 to 65.

The tall resin used in accordance with this invention is a resin acid fraction of tall oil. This resin may be extracted from tall oil by fractional distillation. Tall oil itself is a byproduct in the preparation of sulfate pulp from pine wood. It will be understood that the physical and chemical properties as well as the composition of tall resin slightly vary with the source and that its softening point is generally about 73° C.

The rosin adhesive useful for the purposes of this invention includes gum resin as well as wood resin and in general this natural resinous polymeric material will have a softening point of from about 100° to 150° C. and an acid number of 150 or more.

The preferred thread-containing reinforcing films of this invention, which have an uninterrupted film surface and which are made of synthetic fabrics having a mesh size or area of 5 to 10 mm$^2$ will usually contain at least 50 percent by weight, and usually from about 55 to 75 percent by weight of adhesive based on the total weight of the film.

The invention will be further understood by reference to the following examples:

EXAMPLE I

In this example a thread-containing reinforcing film having the construction shown in FIG. 1 is produced by using an apparatus of type illustrated in FIG. 3. A woven fabric of polyethylene terephthate threads (each consisting of two 1000 denier multifilament yarns) having a mesh size or area of 5 mm.$^2$ is passed over the lower belt of the apparatus and a film of molten montan resin having a solidifying point of 75° to 76° C. is applied to the fabric at a rate to sufficiently produce a film product containing approximately 60 percent by weight of the adhesive. The adhesive also contains 10 percent by weight of a copolymer of vinylacetate and ethylene as a softening agent. An upper endless belt applies a downward pressure on the adhesive covered fabric while a radiant heater heats the adhesive and fabric to a temperature of approximately 100° C. Thereafter the impregnated and film-covered fabric is rapidly cooled to room temperature, sprayed with talcum powder and then wound into a roll.

EXAMPLE II

The thread-containing film produced in Example I is used for the manufacture of a reinforced asphalt road surface. A foundation layer of an asphaltic material is rolled to a thickness of about 7 cm. on a sublayer of mechanically compacted sand. This foundation layer is made up of a mixture of gravel, sand, low grade filler and asphalt bitumen 80/100 with the weight of the asphalt being approximately 5.5 percent by weight of the total mixture. Thereafter the thread-containing reinforcing film produced in Example 1 is rolled over the foundation layer; the film being stretched in the longitudinal and traverse directions and pinned down. Then a second layer of asphalt-containing material is provided on the film and rolled to a thickness of 7 mm. This layer has the same composition of asphalt and mineral mass as the foundation layer. Subsequently, a thick top layer consisting of broken stone, sand and medium grade filler and asphalt bitumen 80/100 (5.5 percent by weight of the total mixture) is applied to the second asphalt layer. In this procedure the asphalt layers are worked up at temperatures of about 145° C.

It is found that the dimensional stability of this asphalt road is equal to and sometimes greater than that of asphalt roads prepared with a bitumen-containing emulsion but without the use of the thread-containing reinforcing film. It will be understood within the construction of this road, only one reinforcing film was used, it is, however, possible to use a reinforcing film between each layer of asphalt or bitumen-containing material.

What we claim is:

1. A process for the manufacture of a film reinforced bituminous structure having at least one bitumen-containing layer which comprises applying a thread-containing film to a layer of material to be bonded to a bitumen-containing layer, said film being formed of a plurality of synthetic reinforcing threads having spaces therebetween filled with a polymeric adhesive, and thereafter applying a molten layer of bitumen-containing material to said film whereby said adhesive will soften and promote adhesion between the two layers of material and said synthetic threads.

2. The process of claim 1 in which the adhesive used to form said film comprises montan resin.

3. The process of claim 1 in which the adhesive used to form said film comprises tall resin.

4. The process of claim 1 in which the adhesive used to form said film comprises rosin.

5. The process of claim 1 in which use is made of a film containing an adhesive which comprises a synthetic polymer having a softening point higher than 50° C., which, when in a softened condition, wets the synthetic threads and which is miscible with bitumen.

6. The process of claim 1 in which the adhesive used to form said film contains a softening agent.

7. The process of claim 6 in which the softening agent comprises from about 5 to about 20 percent by weight of the film.

8. The process of claim 6 in which the softening agent comprises a copolymer of vinyl acetate and ethylene.

9. The process of claim 1 in which the reinforcing threads are formed of drawn polyester threads.

10. The process of claim 1 in which said synthetic reinforcing threads are crossing threads of a fabric, the surface area of the meshes between the crossing threads being at least approximately 5 mm.$^2$.

11. The process of claim 1 in which said layer of material comprises a sublayer of a sand bed, said reinforced film is directly applied to said sublayer, and one or more bitumen layers are applied to said film.

12. The process of claim 1 in which the film is applied between two successive bitumen-containing layers.

13. An apparatus for forming a thread-containing polymeric film, which comprises lower and upper driven endless belts, means for supplying a sheet of synthetic threads between said belts, means for applying molten adhesive to said sheet, and heating and cooling means, which extend one after the other in the direction of travel of the belts, for successively heating the adhesive-covered sheet to insure that the spaces between the threads are filled with the adhesive, and then cooling the adhesive-covered sheet to form a continuous thread-containing film, and means for withdrawing the cooled film from between said belts.